United States Patent [19]
Lanaro et al.

[11] Patent Number: 5,835,982
[45] Date of Patent: Nov. 10, 1998

[54] DEVICE FOR WITHDRAWING AND WEIGHING PRODUCTS SUCH AS, FOR EXAMPLE, DYE PRODUCTS IN TEXTILE INSTALLATIONS

[75] Inventors: Walter Lanaro, Trivero; Paolo De Bona, Soprana, both of Italy

[73] Assignee: Lawer S.p.A., Italy

[21] Appl. No.: 732,665

[22] Filed: Oct. 16, 1996

[30] Foreign Application Priority Data

Oct. 17, 1995 [IT] Italy ................................... T095A0833

[51] Int. Cl.⁶ .......................... G01G 19/02; G01G 21/22; B65B 1/04
[52] U.S. Cl. ......................... 177/145; 177/146; 177/244; 177/253; 177/262; 141/83; 141/101; 141/103
[58] Field of Search ..................... 336/145, 146, 336/244, 253, 262; 141/83, 100, 101, 103, 104

[56] References Cited

U.S. PATENT DOCUMENTS

| | | | |
|---|---|---|---|
| 4,494,678 | 1/1985 | Klein | 222/77 |
| 5,115,876 | 5/1992 | Chang et al. | 177/145 |
| 5,345,041 | 9/1994 | Swanson | 177/105 |
| 5,381,837 | 1/1995 | Kurosu et al. | 141/83 |

*Primary Examiner*—Michael L. Gellner
*Assistant Examiner*—Anh Mai
*Attorney, Agent, or Firm*—Banner & Witcoff, Ltd.

[57] ABSTRACT

A carriage is movable along a row of tubs in which products to be withdrawn are located. On the carriage is mounted a balance for weighing products which are delivered from the tubs. During the withdrawal and weighing operation the balance is deposited by the carriage onto a support structure of high precision and stability. Preferably the bucket into which the products are delivered is also deposited on the platform of the balance only during the weighing operation, whilst it is maintained raised during translation of the carriage along the row of tubs.

26 Claims, 3 Drawing Sheets

DEVICE FOR WITHDRAWING AND WEIGHING PRODUCTS SUCH AS, FOR EXAMPLE, DYE PRODUCTS IN TEXTILE INSTALLATIONS

FIELD OF THE INVENTION

The present invention relates to devices for withdrawing and weighing products according to the preamble of claim 1.

BACKGROUND OF THE INVENTION

Devices of the above-specified type are known in the art in that they are utilised, for example, for withdrawing metered quantities of dyes such as powdered dyes in textile installations. See, in this connection, for example, Italian Patent IT-B-1 211 592 in the name of the same Applicant.

SUMMARY OF THE INVENTION

The present invention seeks to provide a further improvement in the previously-known arrangements, above all as far as the precision of the weighing operation is concerned. As is known this operation is normally performed with a balance mounted on a withdrawal carriage which is movable along a guide structure so that it can be selectively positioned in front of one of the containers from which a respective metered quantity of product is to be withdrawn.

According to the present invention this object is achieved by a device having the characteristics set out in the following claims.

The invention will now be described purely by way of nonlimitative example, with reference to the attached drawings, in which:

DETAILED DESCRIPTION OF THE INVENTION

Figure 1:
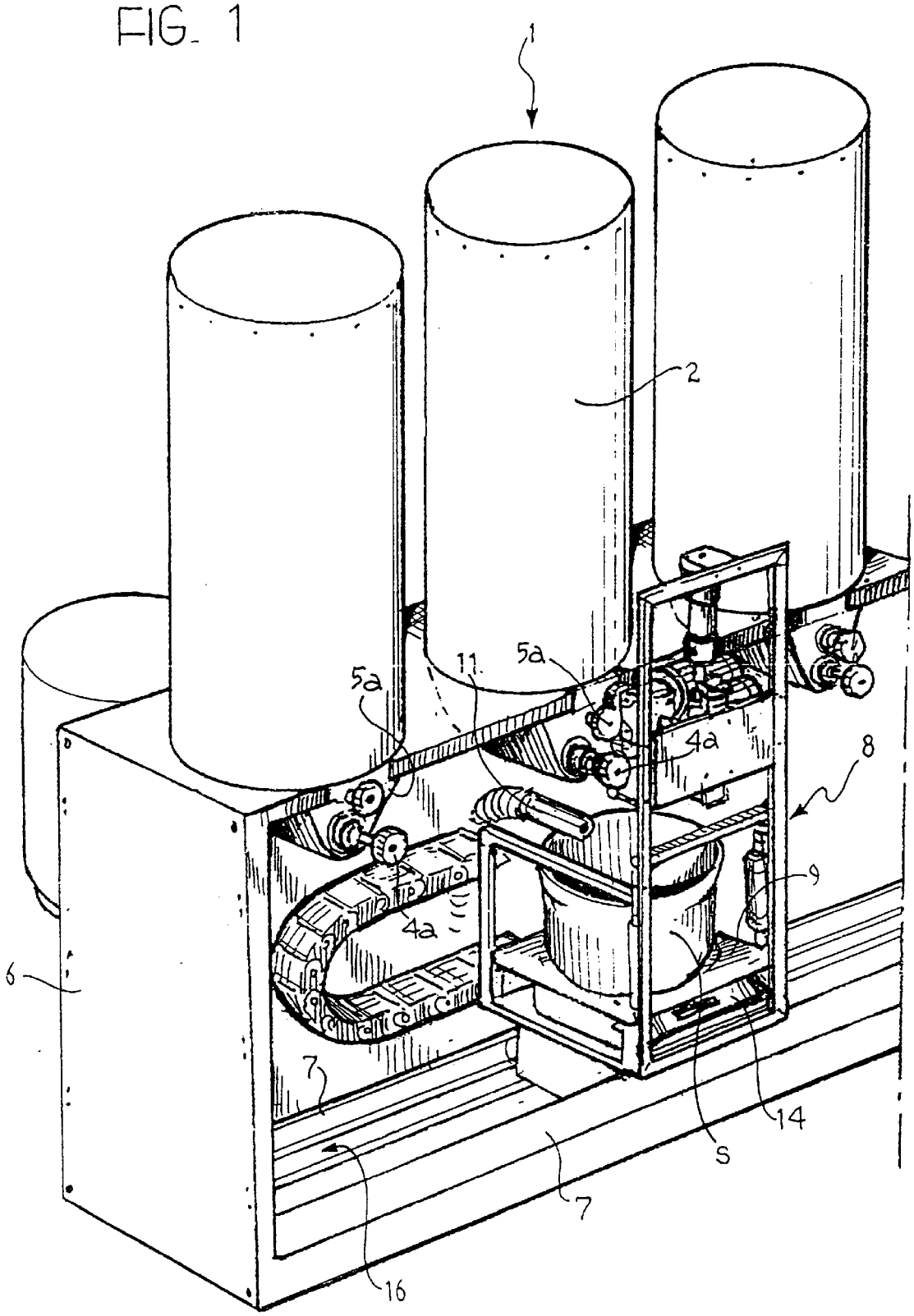
FIG. 1 is a general perspective view of a system for storing products such as dyes for use in the textile industry, equipped with a withdrawing and weighing device according to the invention.

In the drawings an installation for the storage and delivery of metered quantities of products such as, for example, dye products for use in the textile industry is generally indicated with the reference numeral 1.

According to widely known criteria, the installation is essentially composed of a plurality of storage containers (or tubs) 2 within each of which there is a respective quantity of dyestuff, normally in the form of a fine powder, introduced by means of a suction line P from reference containers generally indicated H.

Each tub 2 is normally provided, usually at its lower end, with a delivery outlet 3 through which the product can be withdrawn from the tub 2 by the action of a delivery member 4. The delivery member is usually constituted by a screw conveyor operated according to criteria which will be better illustrated hereinafter. Preferably, and also here according to an arrangement known per se, above the screw conveyor delivery member 4 is located an agitator member 5 the function of which is to stir the product in the lower part of the tub 2 so as to facilitate its withdrawal and delivery through the outlet 3 avoiding the formation of lumps and clumps.

The tubs 2 are arranged in a row (usually rectilinear or, possibly, in a closed loop) and located at a certain height on a base frame 6 of the installation, usually constituted by robust metal beams or the like.

The tubs 2 are thus arranged with their delivery outlets 3 aligned at a certain height with respect to the plane of the ground T on which the framework 6 rests. The reference numeral 7 indicates a guide or rail assembly which extends along (and preferably below) the line along which the outlets 3 are aligned. A withdrawal carriage 8, also usually constituted by a solid frame (for example of metal beams) is movably disposed (usually by means of rollers) on the guides or rails 7 so as to be movable along the row of tubs 2 so as to displace a respective withdrawal table 9 beneath the delivery outlets 3. In use, on the table 9 are disposed withdrawal containers typically constituted by buckets S intended to receive metered quantities of the products contained in the tubs 2 delivered through the outlets 3.

The reference numeral 10 generally indicates a suction structure provided with suction inlets 11 intended also to move along the row of tubs 2 in correspondence with the delivery outlets 3, for the purpose of collecting the volatile substances (dust, fumes etc) which may possibly develop during the delivery of the products into the containers S thereby preventing such volatile products from dispersing into the environment. The suction structure 10 is connected to a subatmospheric pressure (depression) source not illustrated. The reference numeral 12 indicates an (electric and/or fluidic) motor which, via generally known transmission elements, not illustrated in detail and schematically indicated 13, control the movement of the withdrawal carriage 8 along the guides 7.

In use of the installation the carriage 8 is successively brought (for example on the basis of a working sequence controlled by a processor system such as a mini processor or typically a so-called PLC) beneath the tub or tubs 2 from which it is desired to withdraw respective quantities of the product. The withdrawal of the product from the or each tub involved causes (under the control of an operator, or preferably in an automatic manner controlled by the mini processor or PLC which supervises the operation of the installation 1) the delivery outlet 3 to be maintained open and/or the respective delivery member 4 to be maintained in operation until a balance 14 (typically of electronic type) mounted above the withdrawal carriage 8 and which supports the bucket S, indicates that the desired quantity of product has been delivered into the bucket S itself.

All the above is formed according to criteria known per se which therefore does not need to be described further in detail in this description, especially because it is per se not strictly relevant to the understanding of the operation of the present invention.

In the arrangement according to the invention, substantially coextensively with respect to the guides 7 (for example in the exemplary arrangement illustrated in the attached drawings, in an intermediate position with respect to the rails 7) is located a support structure 16 constituted, in the illustrated embodiment, by a track formed by two rails 17 (preferably two hollow metal sections) which rest on the ground T via support elements such as legs 18. Preferably these are adjustable support elements which are finely adjustable in that they are provided with height-adjustable screw feet 19. This arrangement, or other equivalents, make it possible to achieve an exact horizontal orientation (in general an exact collinearity) of the support structure 16 with the path of movement of the carriage 8.

As opposed to the guides 7, with which the carriage 8 constantly maintains a rolling contact relationship, the support structure 16 is intended to come into contact with the balance 14, supporting it only when the balance 14 is effectively utilised for performing a weighing operation.

To this end beneath the balance 14 are respective legs (or equivalent support structures) 20 also preferably adjustable in a micro metric manner, intended to rest on the rails 17. Simultaneously, the balance is also supported in a raised position by a support structure 21 preferably having a bracket-like configuration, mounted on the carriage 8 by respective vertical guides 21a with the interposition of a lifting unit comprising one or more fluid pressure actuators 22. The support structure 21 and the balance 14 which is located on it are therefore capable of vertical translation between a "movement" position (illustrated in FIG. 2) in which the actuator or actuators 22 maintain the support structure 21 in a raised position ensuring that the balance 14 (and in particular its support formations 20) are raised with respect to the support structure 16, and a "working" position (illustrated in FIG. 3) in which the actuator or actuators 22 lower the support structure 21 as far as necessary to make the balance 14 rest with its support formations 20 on the support structure 16.

Preferably, leg formations 23 (or equivalent means) project upwardly from the support structure 21 the upper ends 23a of which leg formations are able to cooperate with the structure defining the support table 9 on which the bucket S is disposed. All this in such a way as to ensure that, in the raised "movement" position (FIG. 2) the balance 14 is separated from and spaced from not only the support structure 16 but also the bucket S: this is so that the table 9 on which—in use—the bucket S is located is supported by the upper ends 23a of the legs 23 so as to maintain them separated from the weighing platform (schematically indicated 14a) of the balance 14.

Figure 3:
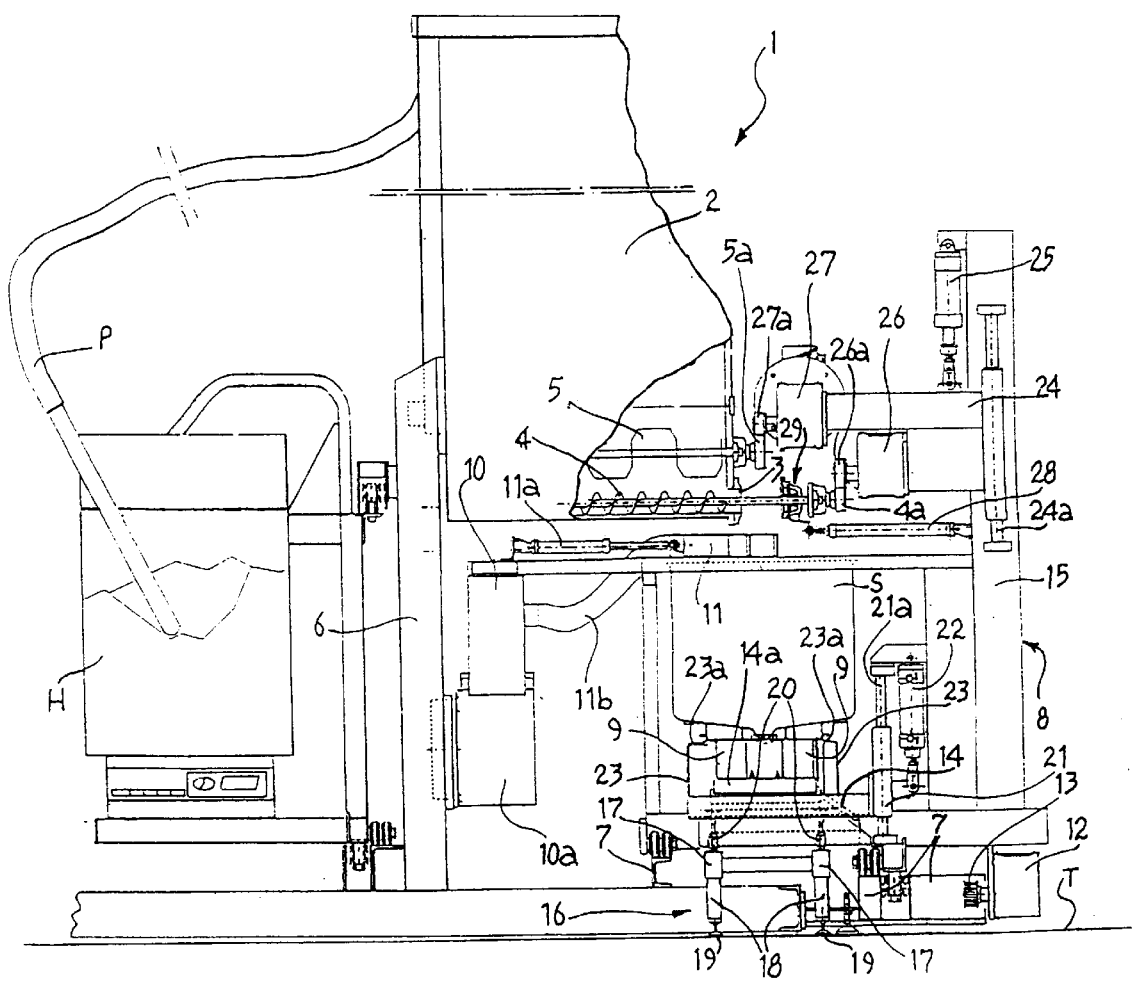

On the other hand, when the actuator or actuators 22 lower the support structure 21 towards the "working" position making the balance 14 rest on the support structure 16, the legs 23 also descend downwardly sufficient to disengage the support table 9 which, still carrying the bucket S, descends onto the platform 14a of the balance as illustrated in greater detail in FIG. 3.

The above-indicated result is obtainable, for example, by the relative dimensioning of the balance 14, its support formations 20, the table 9 and the legs 23. All this working in such a way that in the overall lifting movement of the support structure 21 the upper ends of the legs 23a engage the support table 9 (and the container S which is located on it) lifting it with respect to the platform 14a of the balance slightly before the balance 14 is raised, again by the support structure 21, from the support structure 16.

In a complementary way, during the lowering movement, the support structure 21 first lowers the balance 14 onto the support structure 16 and then descends further by a distance necessary to make the upper end 23a of the legs 23 deposit the support table 9 (and the container S which is located on it) onto the platform 14a of the balance.

Preferably the suction inlets 11 are mounted on the carriage 8 with the ability to move to and fro with respect to the mouth of the bucket S which is located on the balance 14 so as to be displaceable between a generally retracted position (FIG. 2), utilised when the carriage 8 moves the bucket S past the tubs 2, and an extended position (FIG. 3) utilised when delivery of the products from respective tubs 2 (FIG. 3) takes place. This movement, which is achieved under the action of an actuator element 11a, is made possible by the connection between the inlets 11 and the suction tank 10 made by means of an associated flexible tube 11b. It will be appreciated that the assembly constituted by the suction tank 10, the inlets 11 and the flexible tube 11b, as well as the actuator 11a (also subject to the PLC which superintends the overall operation of the installation 1) is mounted on the carriage 8, whilst the main suction tank 10a is a fixed structure with respect to which the suction tank 10 is movable in a manner generally similar to that described in utility model IT-U-197,122 owned by the same Applicant.

Preferably, and again for the same purposes, that is to say to limit as much as possible the dispersion of the volatile substances, the carriage 8 is provided with a cover panel 15 on its front face (that is to say on the outer side with respect to the installation, which is that usually observed by the operator who supervises the operation of the installation 1). Typically this may be a sheet, possibly folded, of rigid material such as stainless steel or the like which defines an outer containment wall of the region in which the delivery of products takes place.

In a preferred embodiment of the invention the uppermost part of the carriage 8 (thus its part most closely adjacent the delivery outlets 3 of the tubs 1) carries a further unit or assembly 24 translatable in height on guides 24a under the action of at least one further fluid pressure actuator indicated 25.

The actuator 25, like the actuator or actuators 22 just described, are also subjected to control by the same member, (for example a PLC) which supervises the general operation of the installation 1.

On the assembly 24 is mounted a drive unit comprising one, although in the preferred embodiment illustrated here there are two, motors (also of electric or fluid type) indicated with the reference numerals 26 and 27, which drive respective drive members, here represented by toothed wheels 26a, 27a having horizontal axes. The function of the motor or motors 26 and 27 is that of driving the delivery/agitation unit for the tub 2 in front of which the carriage 8 is located from time to time during performance of the product withdrawal and weighing operation. This arrangement avoids having to associate a respective product delivery/agitation unit with each tub 2. In practice, by adopting the arrangement according to the preferred embodiment of the invention, each tub 2 is simply provided with a passive structure (constituted by the screw conveyor 4 and, if present, the agitator 5) which projects from the front of the respective tub 2 with respective toothed wheels 4a, 5a (having horizontal axis in the preferred embodiment) for driving them. Furthermore, in the case of the screw conveyor 4, further drive means can be provided (also here constituted, for example, by a fluid actuator 28) the function of which is that of controlling a shutter unit 29 carried by the screw conveyor 4. The unit 29 is intended to close the delivery outlet 3 and, when driven to open, to uncover the respective outlet 3 allowing delivery of product through it.

Except for the structural differences of the elements and the associated controlled members (remembering also that the presence of the agitator 5, in addition to the conveyor 4, is optional) the function of the two motors 26 and 27 mounted on the movable assembly 24 is generally identical, which makes a separate description of them superfluous.

In this connection it will be sufficient to note that the assembly 24 is also movable vertically on the guides 24a between a raised position (FIG. 2) in which the respective drive wheels 26a, 27a of the motors 25, 26 are kept disengaged from the toothed wheels 4a, 5a, of the conveyor 4 and the agitator 5 and a position (FIG. 3) in which the assembly 24 carries the toothed wheels 26a, 27a of the motors 26 and 27 down to engage the toothed wheels 4a and 5a.

It is entirely apparent that, with the assembly 24 in the raised position, the toothed wheels 26a, 27a of the motors 26, 27 do not interfere with the toothed wheels 4a, 5a which project from the tubs 2 so that, in these conditions, free movement of the carriage 8 along the guides 7 is possible.

Consequently, during the withdrawal and weighing operation (which takes place in a known manner already set out in the introductory part of the present description) the carriage 8 and the members which are located on it are generally placed in two different operating positions, that is to say:

- a raised or "movement" position in which the carriage 8 is free to move on the guides 7 under the action of the motor 12 to bring it into correspondence with the tub 2 from which it is to withdraw a certain quantity of product, and
- a lowered or "working" position assumed when the carriage 8, moving on the guides 7, has reached the tub 2 in question and is positioned to make a metered delivery of the product into the bucket S.

Figure 2:
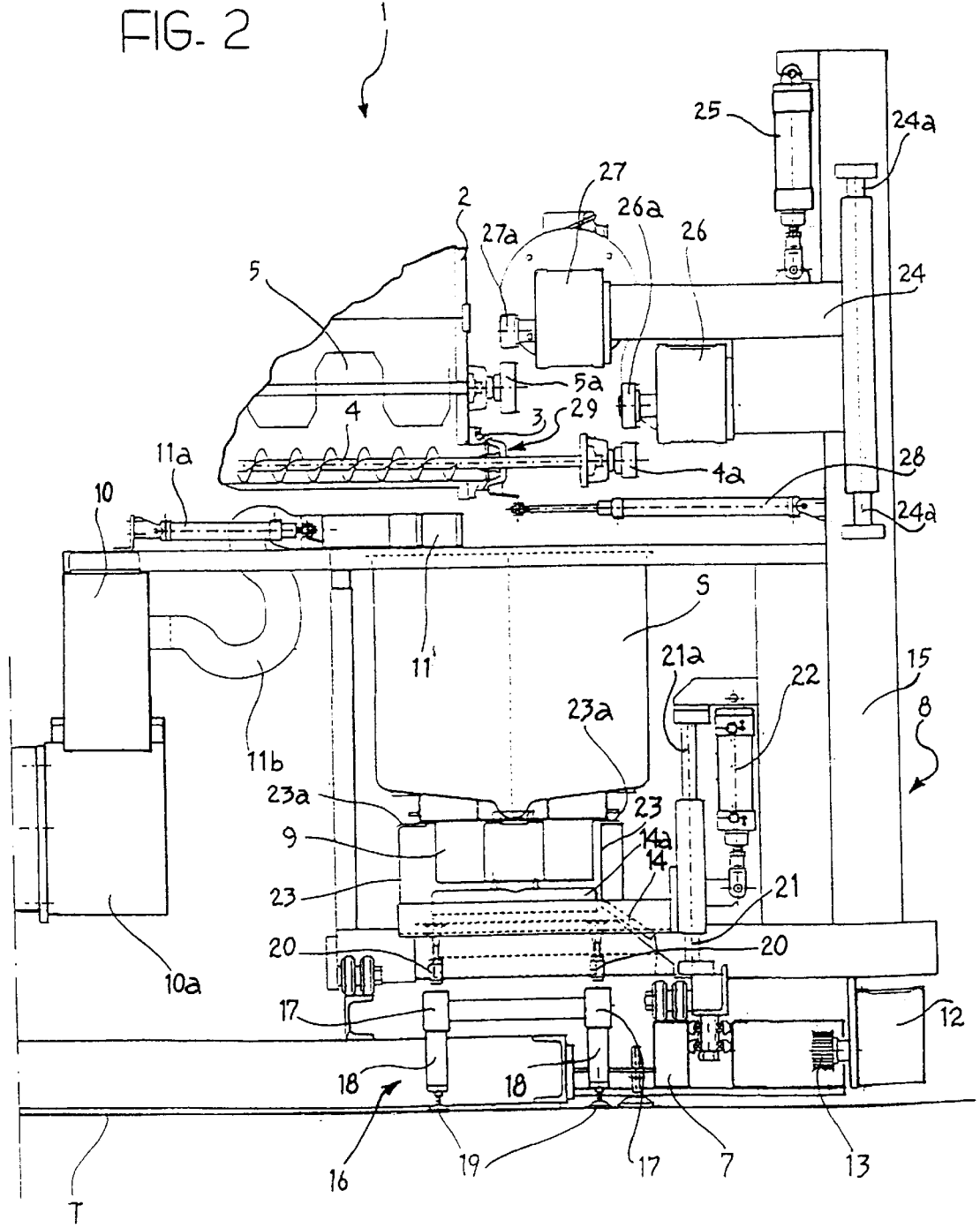
FIGS. 2 and 3 are two schematic views in section taken on the line II—II of FIG. 1, which illustrate the withdrawing and weighing device of the invention in two different possible working positions.

In the "movement" position the following conditions are achieved according to the previously described mode of operation, the balance 14, is raised by the support structure 21 with respect to the support structure 16 and at the same time the bucket S, resting on the table 9, is maintained raised (by the legs 23 in the embodiment illustrated here) with respect to the weighing platform 14a of the balance 14, the suction inlets 11 are located in the retracted position with respect to the balance 14 and therefore with respect to the bucket S, the actuator 28 is in a disengagement position with respect to the actuation unit 29, which maintains the delivery outlets 3 of the tubs 2 in the closure position, and the assembly 24 is in a raised position so that the motors 26, 27 are disengaged from the conveyors 4 and the agitators 5 of the various tubs 2. This movement condition is shown in FIG. 2.

In the working position illustrated in FIG. 3 the following conditions are achieved:

the support structure 21 is lowered so that the balance 14 rests on the support structure 16, whilst the container S rests on the table 9 in turn resting on the platform 14a of the balance 14;

the suction outlets 11 are projected forwardly over the balance 14 towards the region in which delivery of the product into the bucket S takes place, the delivery outlet 3 of the tub 2 in front of which the carriage 8 is located is open to effect displacement of the associated closure structure 29 moved by the actuator 28, and the assembly 24 is lowered so as to bring the toothed drive wheels 26a, 27a of the motors 26 and 27 into mesh with the toothed wheels 4a and 5a which drive the metering screw conveyor 4 and the agitator 5.

In the said working position, with the suction inlets 11 activated, the motor 26 drives the screw conveyor 4 so as to cause product to flow out from the tub 2 (preliminary agitated by the agitator 5 driven by the motor 27 so as to eliminate lumps or clumps) through the outlet 3 opened by the separation of the closure structure 29 moved by the actuator 28. The delivered product thus falls into the underlying bucket S whilst possible dispersion of volatile substances into the environment is effectively countered partly by the presence of the screen 15 but, above all, by the suction action taking place through the inlets 11. The withdrawal operation continues until the balance 14 verifies that the desired quantity has fallen into the container S (preliminarily determined in a manner generally considered known, for example under the control of a program introduced into the processor which controls the installation 1).

Having completed the delivery action the carriage 8 is brought back into the movement position illustrated in FIG. 2. It is therefore again free to move along the guides 7 to take the bucket S in front of another tub 2 from which it is desired to withdraw a determined quantity of product (or to the outlet from the installation when the previously delivered product is the last determined withdrawal in the sequence of metered delivery).

It will be appreciated that the presence of the support structure 16, precisely adjustable in conditions of very high precision, on which the balance 14 is supported during the weighing operations, ensures that the balance 14 itself can operate in ideal conditions avoiding imprecisions and intrinsic uncertainty of those situations in which the balance 14:

- is partly supported, even during the performance of the weighing operation, by the carriage 8 which carries it beneath the delivery outlet 3 from the tubs and/or
- supports the bucket S on its weighing platform, even during displacement between different withdrawal positions.

Moreover, the arrangement according to the invention prevents vibrations which develop during delivery of the product by the effect of the energisation of the motors 26 and 27 transmitting, through the carriage structure 8 to the balance 14.

What is claimed is:

1. A device for withdrawing and weighing products comprising:

a guide structure defining a path of movement, a carriage movable on said guide structure along said path of movement between a plurality of product weighing and withdrawal positions, weighing means carried by said carriage so as to be movable along said path, a support structure for said weighing means substantially coextensive with said guide structure, and support means associated with said carriage to support said weighing means; said support means being selectively movable between a raised position in which said support means maintains said weighing means raised with respect to said support structure, and a lowered position in which said weighing means rests on said support structure.

2. A device according to claim 1, wherein said support structure has position adjustment means.

3. A device according to claim 2, wherein said position adjustment means comprises support feet of adjustable height.

4. A device according to claim 1, wherein said support structure includes a plurality of rail formations.

5. A device according to claim 1, wherein said guide structure includes a plurality of spaced guide elements, and wherein said support structure is positioned between said guide elements.

6. A device according to claim 1, wherein the said weighing means is provided with respective support formations to rest on said support structure.

7. A device according to claim 1, wherein said weighing means has an associated weighing platform for selectively supporting, in use, at least one container for receiving said products, and wherein said support means has lifting formations to raise said container with respect to said weighing platform when said support means is in the raised position.

8. A device according to claim 7, wherein said lifting formations are constituted by upwardly projecting leg elements extending from a base support of said support means to hold a bottom part of said container.

9. A device according to claim 7, wherein said weighing platform carries an associated intermediate support element for supporting said container in a support relationship on said weighing platform, and wherein said lifting formations contact and move said intermediate support element.

10. A device according to claim 7, wherein said lifting formations are operable to lift said container from said weighing platform before said support means lifts said weighing means when said support means is moved from said lowered position to the said raised position and are operable to lower said weighing means onto said support structure before said lifting formations lower said container onto the said weighing platform when said support means is moved from said raised position to said lowered position.

11. A device according to claim 1, wherein said support means is moved by fluid actuator means.

12. A device according to claim 1, wherein said support means has a generally bracket-like structure and is movably mounted on vertical guides.

13. A device according to claim 1, including suction means movable between a generally retracted disengagement position with respect to said weighing means and an advanced position wherein said suction means projects above said weighing means to suck volatile substances which can develop during the withdrawal of the said products.

14. A device according to claim 13, wherein said suction means comprises:

a source of subatmospheric pressure mounted in a fixed position with respect to said guide structure and substantially coextensive therewith, and an assembly of movable parts including said suction openings mounted on the said carriage.

15. A device according to claim 1, wherein said carriage is provided with a wall covering the regions wherein said weighing means is located to contain the dispersion of volatile substances which can develop during the withdrawal of said product.

16. A device according to claim 1, wherein a row of storage containers contain respective products for delivery, said storage containers having respective delivery outlets arranged along a path substantially coextensive with said path of movement of the said carriage and having associated delivery means selectively operable to effect delivery of a respective product through a respective delivery outlet, and wherein said carriage carries at least one associate motor which in each of the product withdrawal and weighing positions is adapted to drive a respective actuating member of the delivery means associated with one of the said storage containers.

17. A device according to claim 16, including a support assembly for said motor movable between a movement position wherein said motor is disengaged from the actuating members of the delivery means associated with the storage containers and a working position wherein said motor operates in driving relation with an actuating member of the delivery means associated with one of the storage containers.

18. A device according to claim 16, wherein said motor is provided with a toothed driving wheel adapted to engage respective toothed driven wheels of said respective delivery means in meshing relationships.

19. A device according to claim 17, wherein said motor moves between the movement position and the working position by a substantially vertical translation.

20. A device according to claim 17, wherein said support assembly supports a further motor movable between a movement position wherein said further motor is disengaged from the actuating members of the agitator means associated with the storage containers and a working position wherein said further motor operates in driving relationship with an actuating member of the agitator means associated with one of the said storage containers.

21. A device according to claim 17, wherein said support assembly has associated therewith fluid actuating means.

22. A device according to claim 17, wherein said support assembly is mounted on respective vertically extending guide means.

23. A device according to claim 1, wherein a row of storage containers contain respective products to be delivered, said storage containers having associated respective agitator means selectively operable to effect agitation of respective products for delivery, and wherein said carriage carries at least one further associated motor which in each of said withdrawal and weighing positions is adapted to drive a respective actuating member of the agitator means associated with one of the said storage containers.

24. A device according to claim 23, including a support assembly for said further motor movable between a movement position wherein said further motor is disengaged from the actuating members of the agitator means associated with said storage containers and a working position wherein said further motor operates in driving relationship with an actuating member of the agitator means associated with one of the said storage containers.

25. A device according to claim 23, wherein said further motor is provided with a respective toothed driving wheel adapted to engage respective further toothed driven wheels of the agitator means in meshing relationships.

26. A device according to claim 24, wherein said further motor moves between the movement position and the working position by a substantially vertical translation.

* * * * *